US005951819A

United States Patent [19]

Hummell et al.

[11] Patent Number: 5,951,819

[45] Date of Patent: Sep. 14, 1999

[54] OPTICAL DISC ADHESIVE LABEL APPLICATOR

[75] Inventors: Michael Hummell, Newport Beach; Joseph R. Pearce, Irvine, both of Calif.

[73] Assignee: Stomp, Inc., Costa Mesa, Calif.

[21] Appl. No.: 08/928,241

[22] Filed: Sep. 12, 1997

Related U.S. Application Data

[60] Provisional application No. 60/026,150, Sep. 16, 1996.

[51] Int. Cl.[6] .......... B32B 31/00

[52] U.S. Cl. .......... 156/556; 156/538; 156/DIG. 24

[58] Field of Search .......... 156/579, 574, 156/538, 556, 391, 580, 293, DIG. 24

[56] References Cited

U.S. PATENT DOCUMENTS

| | | | |
|---|---|---|---|
| 2,479,028 | 8/1949 | Stoneham . | |
| 2,521,505 | 9/1950 | Doyle . | |
| 2,676,726 | 4/1954 | Von Hofe . | |
| 2,823,634 | 2/1958 | Barth . | |
| 3,206,801 | 9/1965 | Costa et al. . | |
| 3,565,416 | 2/1971 | Williamson et al. . | |
| 4,013,282 | 3/1977 | Kaufmann et al. . | |
| 4,306,344 | 12/1981 | Floss | 29/238 |
| 4,500,079 | 2/1985 | Morghen . | |
| 4,501,054 | 2/1985 | Morgan . | |
| 4,549,922 | 10/1985 | Oishi et al. . | |
| 4,613,392 | 9/1986 | Klar et al. . | |
| 4,687,536 | 8/1987 | Hiromotsu et al. | 156/556 |
| 4,971,648 | 11/1990 | Doering . | |
| 5,194,108 | 3/1993 | White et al. . | |
| 5,292,550 | 3/1994 | Fujii et al. . | |
| 5,316,464 | 5/1994 | Lexell . | |
| 5,336,357 | 8/1994 | Layher . | |
| 5,417,182 | 5/1995 | Fujii et al. . | |
| 5,421,950 | 6/1995 | Parrish . | |
| 5,435,246 | 7/1995 | Edman | 101/333 |
| 5,543,001 | 8/1996 | Casillo et al. | 156/60 |
| 5,709,764 | 1/1998 | Funawatari et al. . | |
| 5,783,033 | 7/1998 | Grossman . | |

FOREIGN PATENT DOCUMENTS

| | | |
|---|---|---|
| B-52145/96 | 8/1996 | Australia . |
| 296 08 885 U1 | 9/1996 | Germany . |
| 296 15 950 U1 | 10/1996 | Germany . |
| 296 10 120 U1 | 11/1996 | Germany . |
| 296 17 424 U1 | 12/1996 | Germany . |
| 297 03 234 U1 | 5/1997 | Germany . |
| 297 03 124 U1 | 6/1997 | Germany . |
| 62-259903 | 10/1987 | Japan . |
| 2 290 526 | 1/1996 | United Kingdom . |
| 2 305 907 | 4/1997 | United Kingdom . |
| WO 96/05057A1 | 2/1996 | WIPO . |
| WO 97/30900 | 8/1997 | WIPO . |

OTHER PUBLICATIONS

Copy of a Tiger Direct "Power Up" Mail Order Copy Magazine Advertisement Showing a ParanalPlacer Labeling Device. The magazine is believed to have been distributed in Aug. of 1997.

*Primary Examiner*—Curtis Mayes
*Attorney, Agent, or Firm*—Walter A. Hackler

[57] ABSTRACT

An apparatus for applying labels on optical discs having a base capable of supporting a label. A plunger element capable of supporting and positioning an optical disc with respect to the label and movably coupled with the base so to be capable of affixing labels on the optical disc concentrically with the rotational axis of the optical disc. A biasing element in cooperative arrangement with the base and the plunger element so as to bias the plunger element toward a position above the base. A locking mechanism that locks the plunger element into a fixed position relative to the base. A foam element positioned on the base and adapted to keeping the label horizontally oriented. A nonskid surface positioned on the bottom of the base for limiting undesired movement of the base. A positioning element coupled with the plunger element and/or the bottom of the base for positioning the biasing element within the base. A means to equalize pressure is provided on the plunger element or the base to prevent pressure differentials.

18 Claims, 5 Drawing Sheets

OPTICAL DISC ADHESIVE LABEL APPLICATOR

This application claims the benefit of application Ser. No. 60/026,150 filed on Sep. 16, 1996 titled Optical Disc Adhesive Label Applicator and having inventors Michael Hummell and Joseph R. Pearce. This application is hereby incorporated into this continuing application by reference.

FIELD OF THE INVENTION

The field of the present invention relates generally to an applicator apparatus for affixing labels onto objects, and more specifically to an applicator apparatus for accurately positioning and affixing annular labels onto electro-optical storage devices.

BACKGROUND OF THE INVENTION

Electro-optical storage devices (optical discs) include compact discs for music and computer applications, video laser discs, CDE discs and DVD discs. They generally comprise of a plastic or glass substrate embossed with a pattern of pits that encode signals in digital format and are typically coated with a metallic layer to enhance reflectivity. They are usually read in a drive that spins the devices at high speeds while employing a focused laser beam and monitoring fluctuations of the reflected intensity in order to detect the pits.

In recent years, writeable optical discs have grown in consumer popularity. However, there is no apparent visual method for determining their contents. Therefore, an increasing need to label these optical discs exist.

Labeling optical discs, however, is complicated by the fact that the capability of the optical disc to accurately represent and store data is dependent on its ability to be placed into a high speed, steady-state spin about its central axis. Thus, a label positioned in a manner that results in a physically unbalanced optical disc is not conducive with the accurate transfer of information.

Consequently, a need exists for a mechanism that can label an optical disc without interfering with the balanced spinning of the disc or the transfer of data to and from the optical disc.

SUMMARY OF THE INVENTION

The present invention is directed to an apparatus for facilitating attachment of labels to objects. In its preferred embodiment, the apparatus affixes a label to an optical disc in a manner that does not interfere with the balanced spinning of the optical disc or the transfer of data to and from the optical disc.

In the preferred embodiment, the apparatus may comprise a base comprising a label supporting surface, a plunger element comprising an upper element and a lower element extending from an optical disc supporting surface in opposite directions. The upper element is dimensioned to fit within a center hole of an optical disc. The plunger element is slidably coupled to the base so that it can move from a first position in which the upper element and at least a portion of the lower element extend above the label supporting surface to a second position in which the optical disc supporting surface is substantially flush with the label supporting surface.

DETAILED DESCRIPTION OF THE PREFERRED EMBODIMENTS

Figure 1:
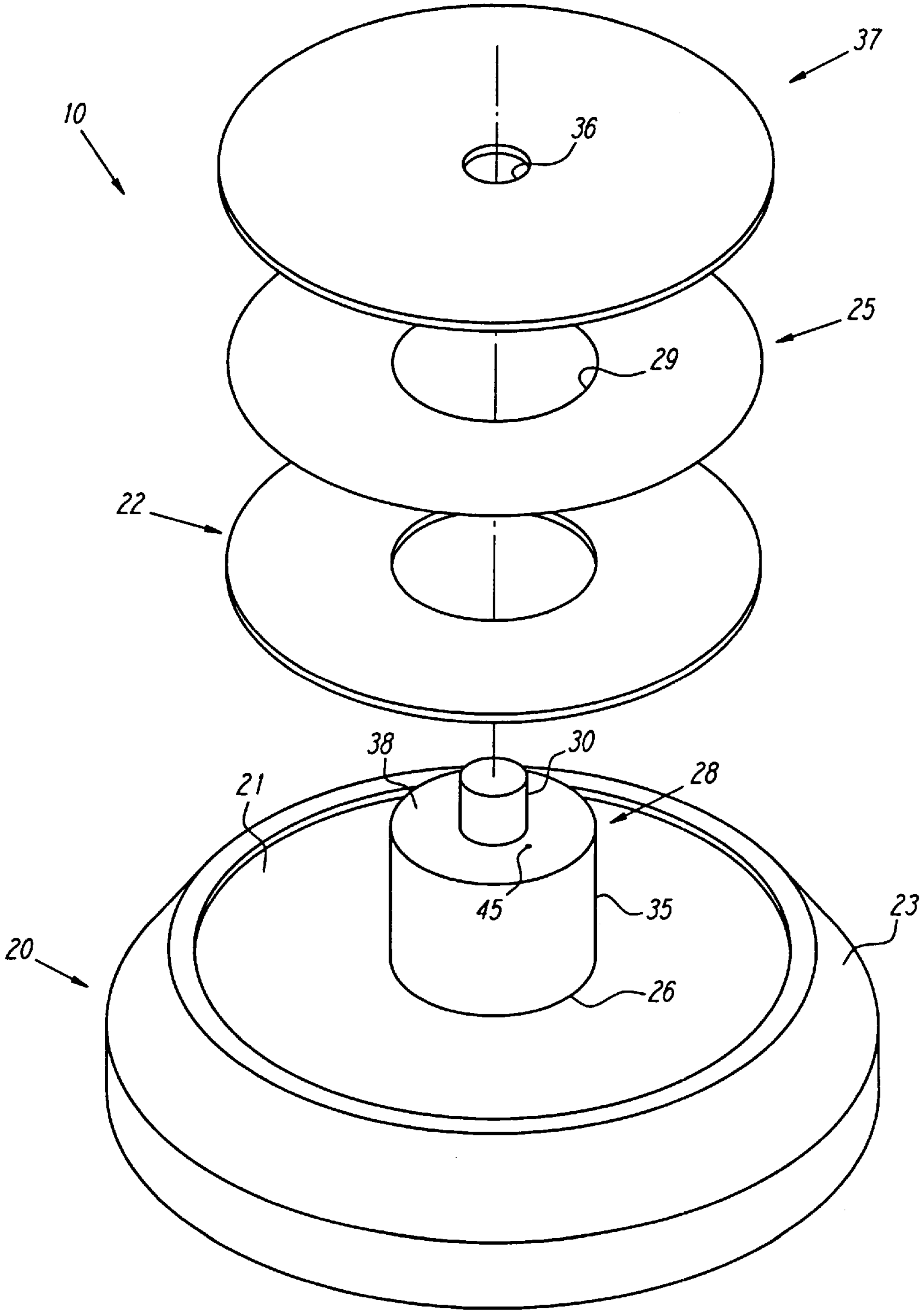
FIG. 1 is a top perspective view of the assembled apparatus of a first preferred embodiment with an optical disc and annular label positioned in ordered concentric alignment above the apparatus.
Figure 2:
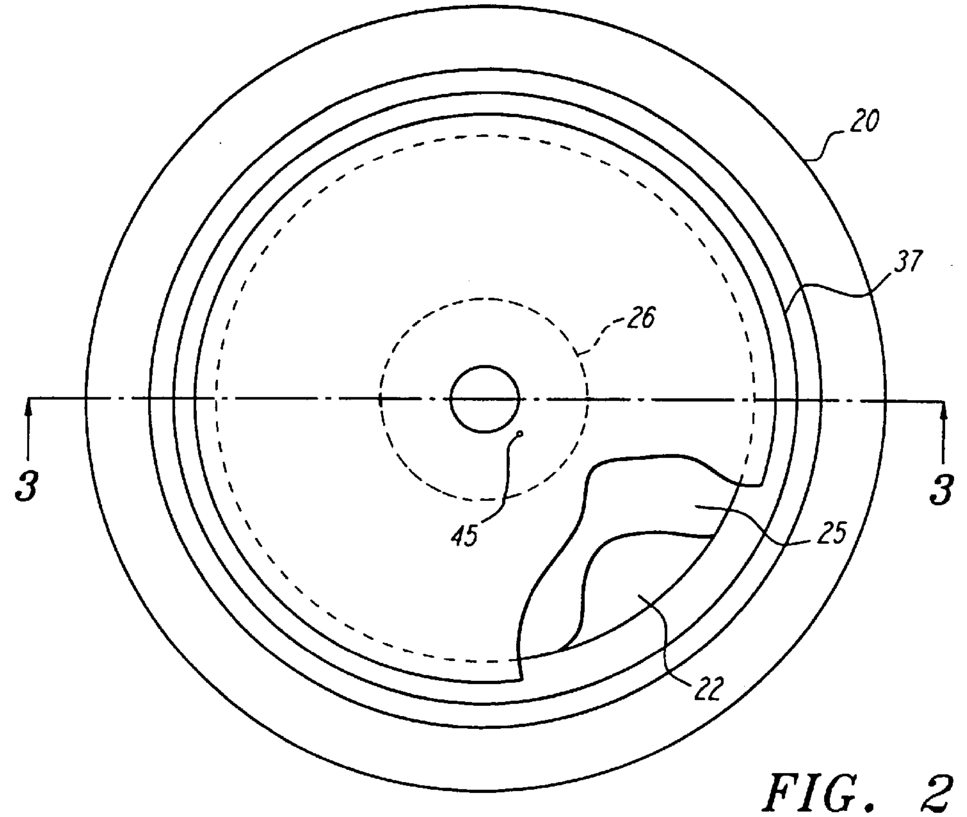
FIG. 2 is a top view of the apparatus of FIG. 1.

Preferred embodiments will now be described with respect to the figures. For clarity of description, any reference numeral representing an element in one figure shall represent the same element in any other figure.

FIGS. 1–8 illustrate a label applicator 10. The apparatus has a base 20 preferably shaped as a wide cylinder having a round, slightly recessed perimeter 23 that provides extra rigidity and support. The base 20 has a top surface 21 that functions to support the label 25 and is preferably flat. The top surface 21 may be covered with a removable and/or permanently affixed foam element 22 having sticky and/or clingy tactile properties adapted to keeping the label 25 horizontally oriented. The foam element 22 may be shaped to fit by die-cutting a foam sheet, however, other suitable fabrication methods and functionally equivalent materials may also be employed.

The apparatus is typically placed on a flat horizontal support surface 5 (see FIG. 3) during use. The base is preferably covered with a non-skid surface 24 positioned opposite the top surface 21 to limit undesired sliding of the base 20 along the support surface 5. In the preferred embodiment, the base 20 further comprises a coupled base bottom 27. The coupling of the base bottom 27 may be achieved by adhesion, mechanical fastening devices, or welding. In the preferred embodiment ultrasonic welding is used to integrally couple the base bottom 27 to the plunger housing element 31.

A hole 26 is positioned in the center of the top surface 21 of the base 20 and accommodates the plunger element 28. In the preferred embodiment, the hole 26 is round and has substantially the same diameter as the round inner hole 29 of the label 25.

The base 20, preferably, further comprises a housing element 31 coupled to the top surface 21 of the base 20. In the preferred embodiment, the plunger housing element 31 has an upper end and a lower end wherein the top surface 21 extends from the upper end and is integrally connected to the upper end. The plunger element 28 is slidably coupled with the base 20 and preferably with the plunger housing element 31. The plunger housing element 31 is dimensioned slightly larger than the hole 26 and is further defined by the dimensions of the plunger element 28 and in the preferred embodiment further defined by the dimensions of the lip element 32. The plunger element 28 is capable of moving up and down relative to the base 20 within and parallel with the length of the housing element 31. In the preferred embodiment, the housing element 31 is cylindrical in shape.

The plunger element 28 is comprised of a lower and upper element, one atop the other, and a lip element 32. The lower element 35 is dimensioned to snugly fit within the hole 26 and be slidably movable within hole 26. In the preferred embodiment, the upper and lower elements are cylindrical in shape. The upper element 30 is dimensioned to fit in a snug fashion inside the center hole 36 of an optical disc 37 and functions to position the optical disc 37 concentrically with the label 25. The upper element 30 has a sufficient height dimension to provide a suitable grasping surface for the user. The upper element 30 attaches integrally to a surface element 38 positioned at the top end of the lower element 35. Preferably, the surface element 38 is flat. The surface element 38 is provided to support an optical disc 37 at a fixed position on the plunger element 28. The bottom end 39 of the lower element 35 is integrally connected to a lip element 32. The lip element 32 is preferably annular in shape. The lip element 32 is dimensioned so that it is capable of being slidably coupled with and within the housing element 31 and allowing the plunger element 28 to easily move up and down in the housing element 31. The lip element 28 may also have one or more channels 40 adapted to move along one or more corresponding lock catch elements 41. The relationship between the catch element(s) 41 and the lip element 32 is discussed in detail below.

Figure 3:
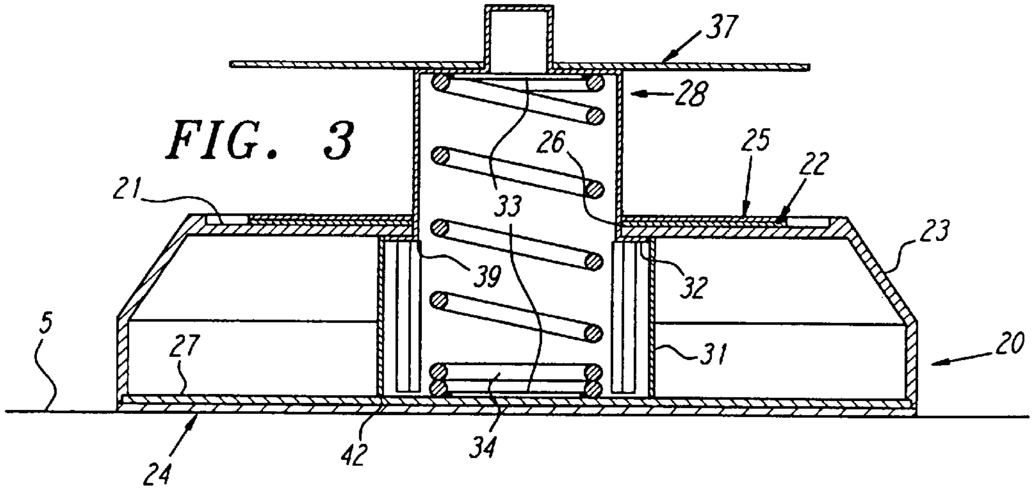
FIG. 3 is a cross-section view of the apparatus of FIG. 1 while in its fully extended position.
Figure 4:
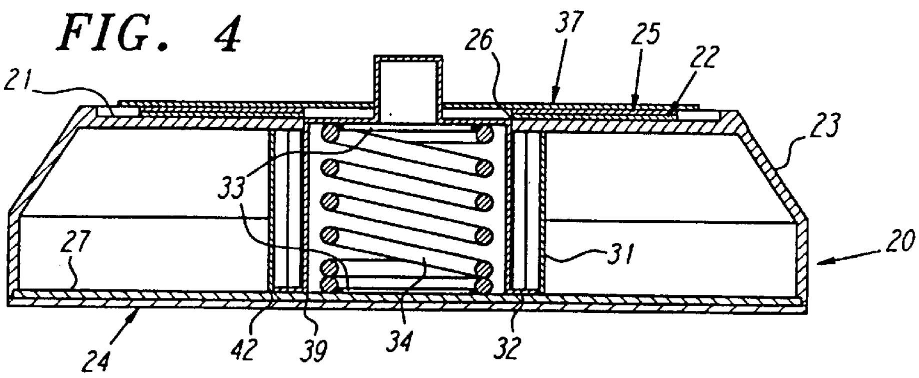
FIG. 4 is a cross-section view of the apparatus of FIG. 1 while in its fully compressed position.

When the apparatus is in the extended position as best shown in FIG. 3 the lip element 32 abuts the inside of the top surface 21 of the base 20 and, thus, functions to prevent the plunger element 28 from coming out of or withdrawing from the base 20. The height dimension of the lower element 35 is the same as or shorter than the dimension measured from the top of the top surface 21 of the base 20 to the lower end 42 of the housing element 31. Thus, as best shown in FIG. 4, in the fully compressed position, the lip element 32 together with the bottom end 39 of the lower element 35 abuts with the upper surface of the base bottom 27 and, thus, functions to position the surface 38 flush with or below the top surface 21 of the base 20. This is best shown in FIG. 4.

In order to prevent pressure differentials between the plunger element 28 and housing element 31 with respect to the pressure outside the base, a means for equalizing pressure is provided preferably in the form of a hole 45 and may be positioned through the surface element 38. The means for equalizing pressure can be provided elsewhere, for example on the housing element 31 or the base bottom 27.

Movement of the plunger element 28 is, preferably, assisted by a compression spring 34 or other suitable biasing element. In the preferred embodiment a compression spring 34 operates with the base bottom 27 and the inside surface of the flat surface element 38 to urge or push the plunger element 28 upwards from the base bottom 27 toward the top surface 21 of the base 20. In this manner, the plunger element 28 is biased upwards and returns to the fully extended position automatically. In the preferred embodiment, the compression spring 34 is positioned with and within the plunger element 28 as shown in FIGS. 3, 4, 5 and 6.

A positioning element 33 is preferably provided to assist in axially positioning the compression spring 34. In the preferred embodiment, as shown in FIGS. 3, 4, 6 and 7, the positioning element 33 comprises an annular protrusion extending from the inside surface of the surface element 38 and/or the inside surface of the base bottom 27. Suitable dimensions of the positioning element 33 are readily ascertainable by one of ordinary skill in the art.

The apparatus may be stored and safely transported in the fully compressed position by pushing the plunger element 28 downward to the fully compressed position and then twisting or rotating the plunger element 28 so that the lip element 32 locks on the catch element(s) 41 that are provided on the housing element 31. Preferably, the catch element(s) 41 are integrally connected with the housing element 31 and can be manufactured together with the base 20 as one piece via an injection molding process or other suitable method known to one skilled in the art.

Figure 5:
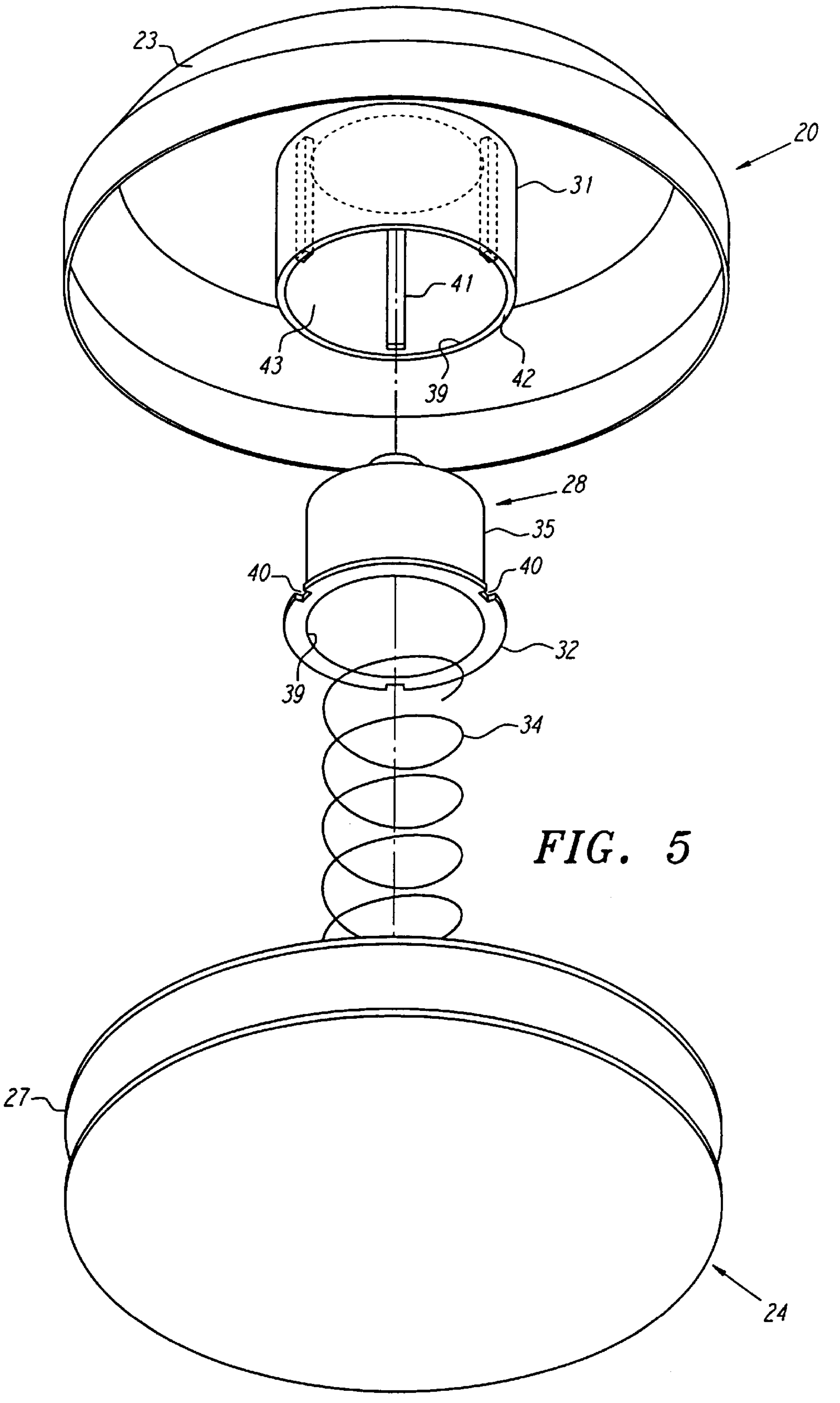
FIG. 5 is an exploded bottom view of the apparatus of FIG. 1.
Figure 6:
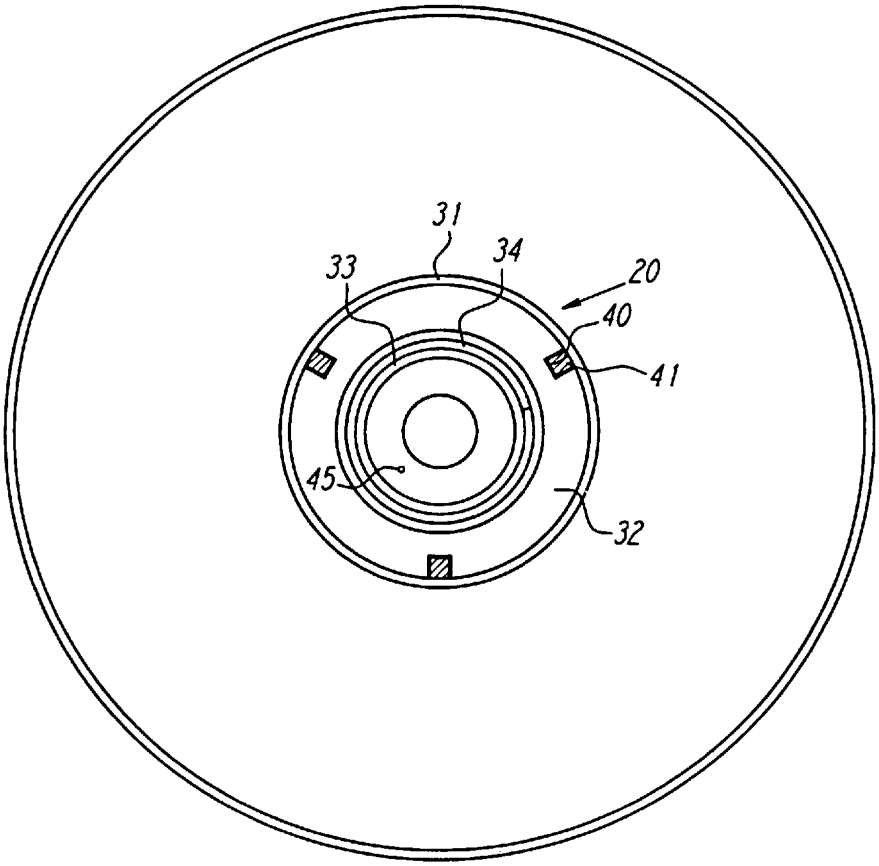
FIG. 6 is a bottom view of the apparatus of FIG. 1 absent the base bottom.
Figure 7:
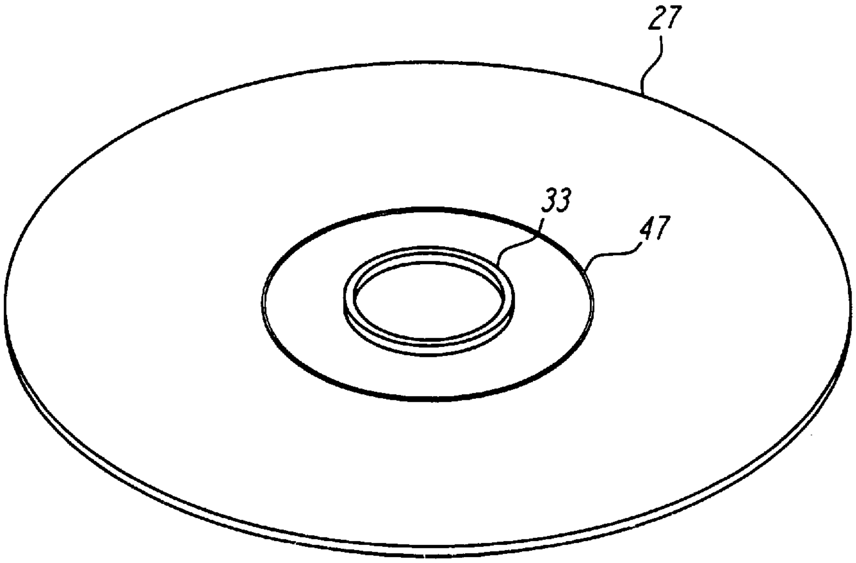
FIG. 7 is a perspective view of the inside surface of the base bottom.

As best shown in FIG. 5, the catch element(s) 41 comprise rail-like structures positioned lengthwise along the inner surface 43 of the housing element 31 beginning from the inner surface of the top surface 21 of the base 20 and extending downwards along the inner surface 43 of the housing element 31. The catch element(s) 41 end a distance short of the lower end 42 of the housing element 31. The distance between the lower end 42 of the housing element 31 and the catch element(s) 41 is approximately equal to the thickness of the lip element 32 so as to allow free rotation of the plunger element 28 while it is in the fully compressed position.

The preferred embodiment contains three catch element (s) 41 positioned equal distance at every 120 degrees around the preferred cylindrical shaped housing element 31. However, other configurations are also feasible and can be readily designed by one of ordinary skill in the art to achieve the same function. As best shown in FIGS. 3, 4 and 5, three channels 40 formed in the lip element 32 correspond to each of the three catch element(s) 41 and are dimensioned so that the plunger element 28 can easily move up and down in the housing element 31 guided by the contact between the catch element(s) 41 and the channels 40. In the fully compressed position, the operator can twist or rotate the plunger element 28 so that the channels 40 no longer are aligned with the catch element(s) 41. When the operator removes downward pressure, the biasing element will push the plunger element 28 upwards thereby locking the lip element 32 on the catch element(s) 41. Upon further twisting by the operator, the catch element(s) 41 become realigned with the channels 40 and the plunger element 28 is capable of returning to its extended position.

Figure 8:
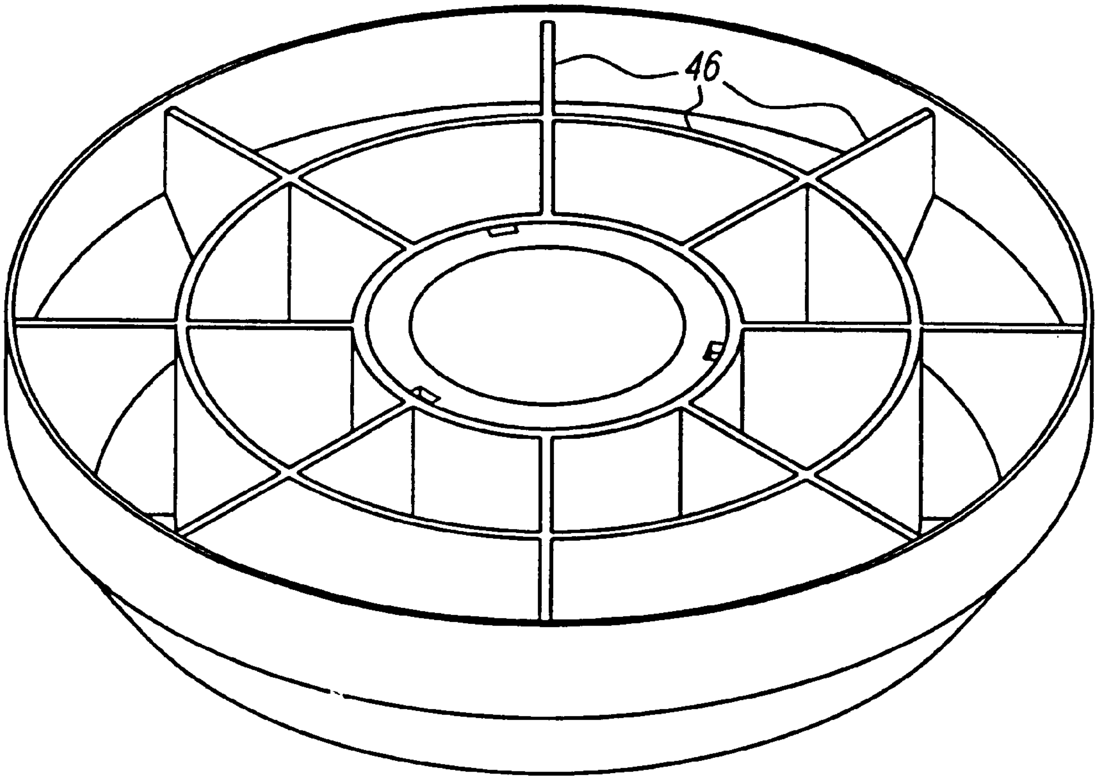
FIG. 8 is a bottom perspective view of a second embodiment of the base absent the base bottom.

In another embodiment, shown in FIG. 8, the base 20 has support members 46 integrally coupled to said top surface. The support members 46 function to provide added support and/or rigidity to the apparatus.

In operation the user acquires an annular label 25 which may be made of paper or other suitable material. Pre-cut annular paper labels with appropriate dimensions backed with adhesive are widely available to the consumer. The protective backing to the adhesive is peeled-off and the label 25 is placed adhesive-side up on the foam element 22, or alternatively, if the embodiment does not have a foam element 22 then directly on the top surface 21 of the base 20. The placement of the label 25 is performed while the plunger element 28 is in the extended position as best shown in FIGS. 1 and 3. The clingy tactile properties of the foam surface assists in keeping the label 25 horizontally oriented, while the lower element 35 of the plunger element 28 keeps the label 25 centrally positioned. Next the user places the optical disc 37 onto the flat surface element 38 so that the side of the optical disc that is to be labeled is facing downward toward the base 20. The upper element 30 functions to position the optical disc in a precisely centered fashion above the base 20 and concentrically with the label 25. Next the user depresses the plunger element 28 using the upper element 30. This motion causes the downward facing side of the optical disc 37 to contact the surface of the label 25 in a centered and properly positioned manner. Next the user reduces or completely removes the downward pressure from the top of the plunger element 28, thus, allowing the compression spring 34 to push the plunger element 28 upward into the extended position. Last, the user lifts the newly labeled disc from the plunger element 28.

The foregoing specification and the drawings forming part hereof are illustrative in nature and demonstrate certain preferred embodiments of the invention. It should be recognized and understood, however, that said description is not to be construed as limiting of the invention because many changes, modifications and variations may be made therein by those of skill in the art without departing from the essential scope, spirit or intention of the invention. Accordingly, it is intended that the scope of the invention be limited solely by the appended claims.

What is claimed is:

1. An optical disc label applicator for applying labels on an optical disc concentrically with a center opening of the optical disc comprising:

a base comprising a label supporting surface having a hole positioned within said label supporting surface;

a plunger element comprising (a) an optical disc supporting surface, (b) an upper element and (c) a lower element, said upper element and said lower element extending from said optical disc supporting surface in opposite directions, said upper element dimensioned to fit within the center opening of the optical disc, said plunger element being slidably coupled to said base through said hole so that said plunger element is movable from a first position in which said upper element and at least a portion of said lower element extend above said label supporting surface to a second position in which said optical disc supporting surface is substantially flush with said label supporting surface; and a biasing element in cooperative arrangement with said base and said optical disc supporting surface to bias said plunger element toward said first position.

2. The optical disc label applicator of claim 1 further comprising a foam element positioned on said label supporting surface.

3. The optical disc label applicator of claim 2 wherein said base further comprises a plunger housing element having an upper end and a lower end, and wherein said label supporting surface extends from said upper end, and said plunger element is slidably coupled in said plunger housing element.

4. The optical disc label applicator of claim 3 wherein said lower element of said plunger element further comprises a lip element and said plunger housing element further comprises at least one catch element wherein said lip element is in cooperative arrangement with said at least one catch element so as to be capable of locking with said catch element in said second position.

5. The optical disc label applicator of claim 1 wherein said base further comprises a non-skid surface positioned opposite said label supporting surface.

6. The optical disc label applicator of claim 1 wherein said base further comprises a plunger housing element having an upper end and a lower end, and wherein said label supporting surface extends from said upper end, and said plunger element is slidably coupled in said plunger housing element.

7. The optical disc label applicator of claim 6 wherein said lower element of said plunger element further comprises a lip element and said plunger housing element further comprises at least one catch element wherein said lip element is in cooperative arrangement with said at least one catch element so as to be capable of locking with said at least one catch element in said second position.

8. The optical disc label applicator of claim 1 further comprising a positioning element, for positioning said biasing element, comprising a member extending from said optical disc supporting surface of said plunger element in the same direction as said lower element in a cooperative arrangement with said biasing element so as to axially position said biasing element.

9. The optical disc label applicator of claim 1 wherein said plunger element has a means to equalize pressure.

10. A device for applying labels to an optical disc, comprising:

a base having a label support platform;

a hole positioned within the label support platform;

a plunger element, comprising (a) an optical disc support platform, (b) a lower element extending from the optical disc support platform, (c) an upper element extending from the optical disc support platform and dimensioned to be slidably receivable within an orifice of the optical disc, the lower element being slidably coupled in the hole so that the optical disc support platform is movable from a first defined position in which the optical disc support platform is located at a maximum distance above the label support platform to a second position in which the optical disc support platform is substantially flush or below the label support platform;

a biasing element being in cooperative arrangement with the optical disc support platform and adapted to bias the plunger element toward the first position.

11. The device of claim 10, further comprising a catch element in cooperative arrangement with the plunger element for preventing the plunger element from moving to the first position.

12. A device for applying labels to an optical disc, comprising:

a base having a label support platform;

a hole positioned within the label support platform;

a plunger element, comprising (a) an optical disc support platform, (b) a lower element extending from the optical disc support platform, (c) an upper element extending from the optical disc support platform in an opposite direction from the lower element and dimensioned to be slidably receivable within an orifice of the optical disc, the lower element being slidably coupled in the hole so that the optical disc support platform is movable from a first defined position in which the optical disc support platform is located at its maximum distance above the label support platform to a second position in which the optical disc support platform is substantially flush or below the label support platform;

a catch element in cooperative arrangement with the plunger element for preventing the plunger element from moving to the first position.

13. The device of claim 12, the lower element further comprising a flange element in cooperative arrangement with the catch element and adapted to prevent the plunger element from moving to the first position.

14. The device of claim 13, the flange element comprising a channel dimensioned to receive the catch element.

15. The device of claim 14, the catch element comprising a rail structure.

16. The device of claim 15, further comprising a biasing element in cooperative arrangement with the plunger element and adapted to bias the plunger element toward the first position.

17. The device of claim 15, further comprising a biasing element being in cooperative arrangement with the optical disc support platform and adapted to bias the plunger element toward the first position.

18. The device of claim 12, the catch element being in cooperative arrangement with the plunger element for preventing the plunger element from moving from the second position.

* * * * *